(No Model.)
E. A. BROWN.
TRACE HOLDER.
No. 371,874. Patented Oct. 18, 1887.
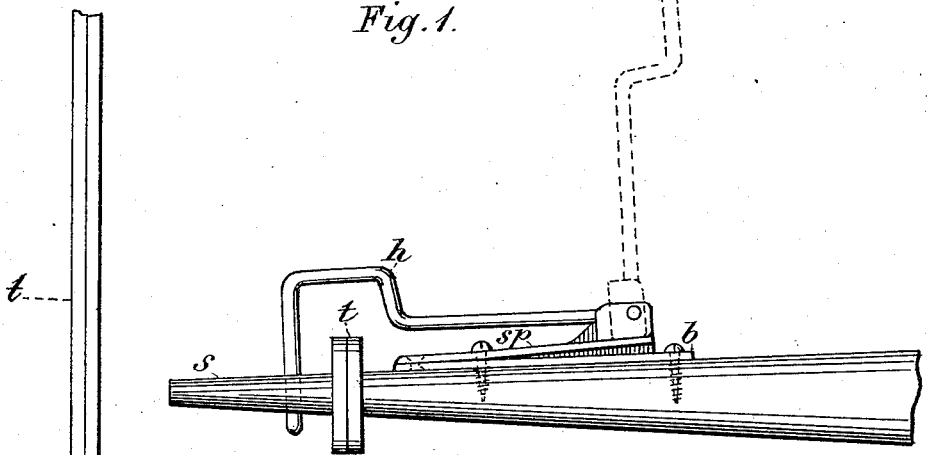
Fig. 1.
Fig. 2.
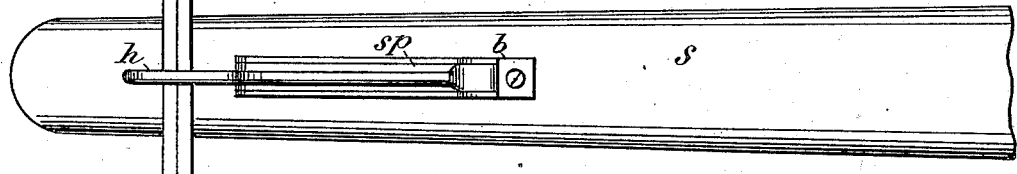
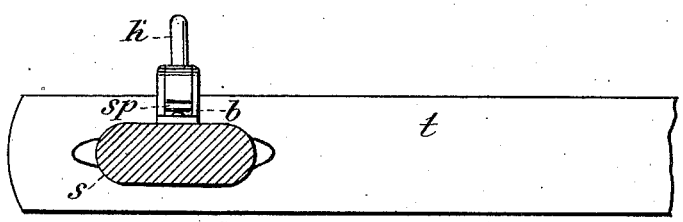
Fig. 3.
WITNESSES.
Gustav Bohn.
E. B. Griffith
INVENTOR.
Ethan A. Brown
By C. F. Jacobs
atty.

UNITED STATES PATENT OFFICE.

ETHAN A. BROWN, OF INDIANAPOLIS, INDIANA, ASSIGNOR OF ONE-HALF TO THOMAS F. QUILL, OF SAME PLACE.

TRACE-HOLDER.

SPECIFICATION forming part of Letters Patent No. 371,874, dated October 18, 1887.

Application filed June 25, 1887. Serial No. 242,533. (No model.)

*To all whom it may concern:*

Be it known that I, ETHAN A. BROWN, of Indianapolis, county of Marion, and State of Indiana, have invented certain new and useful Improvements in Trace-Holders; and I do hereby declare that the following is a full, clear, and exact description thereof, reference being had to the accompanying drawings, in which like letters refer to like parts.

My invention relates to the construction of devices for preventing traces from slipping off the singletree, and will be understood from the following description.

In the drawings, Figure 1 is a side view of my device, showing all the parts in operative position, the dotted lines indicating the position of the hook when raised to allow the trace to be taken off. Fig. 2 is a top view. Fig. 3 is a rear end view of the device, the singletree being shown in cross-section.

In detail, $s$ is a singletree of the sword-blade pattern; $t$, the trace, which is slipped over the end of the singletree. $b$ is a base which is channeled out to receive a spring, $sp$, riveted to the base. $h$ is a hook pivoted in a projection at one end of the base so as to bear upon an end of the spring $sp$ in the manner of a knife-blade. The base $b$ is screwed to the top of the singletree, as shown in Fig. 1. The hook $s$, being opened in the position shown in the dotted lines in Fig. 1, the trace is slipped over the end of the singletree. The hook $h$ is then pushed down, the force of the spring operating to close it quickly, its outer end entering a hole in the end of the singletree, outside the trace, made to receive it. It is then in the position shown in the full lines in Fig. 1, and the force of the spring resists the opening of the hook and is sufficient to keep it firmly in place while in use, thus preventing the trace $t$ from slipping off the end of the singletree $s$.

By raising the hook with the hand after it passes the center point between the pivot and its lowest position the force of the springs aids to throw it up out of the way, and the trace may then be removed.

This holder is inexpensive, easily attached to the singletree, easily operated, and perfectly safe, as the spring is made stiff enough to prevent the hook from being forced out of place or from rattling or getting loose.

The spring $sp$ may be attached simply upon the top of the base without the latter being channeled to receive it, and other variations in construction could be easily made by a skillful mechanic without departing from the principle of my invention, which consists in attaching a hook to the base, the latter to be screwed to the singletree and provided with a spring for holding the hook in position when shut down.

What I claim as my invention, and desire to secure by Letters Patent, is the following:

1. A trace-holder comprising a base for attachment to a singletree, channeled out to receive a spring operating a hook pivoted at the inner end of such base, a spring connected to the base by a screw which also connects the base to the singletree, substantially as shown and described.

2. A trace-holder comprising the base $b$, channeled out to receive the spring $sp$, and a hook, $h$, pivoted at the inner end of such base above the spring, in combination with the singletree $s$, having a hole to admit the end of the hook, substantially as shown and described.

In witness whereof I have hereunto set my hand this 22d day of June, 1887.

ETHAN A. BROWN.

Witnesses:
C. P. JACOBS,
ROBERT P. DUNCAN.